(12) United States Patent
Zheng et al.

(10) Patent No.: US 9,469,554 B2
(45) Date of Patent: Oct. 18, 2016

(54) BIPOLAR ELECTRODE AND SUPERCAPACITOR DESALINATION DEVICE, AND METHODS OF MANUFACTURE

(75) Inventors: Liping Zheng, Shanghai (CN); Hai Yang, Shanghai (CN); Wei Cai, Shanghai (CN); Jianyun Liu, Shanghai (CN); Zhigang Deng, Shanghai (CN); Hui Liu, Shanghai (CN); Lin Chen, Shanghai (CN); Xianguo Yu, Shanghai (CN)

(73) Assignee: General Electric Company, Niskayuna, NY (US)

( * ) Notice: Subject to any disclaimer, the term of this patent is extended or adjusted under 35 U.S.C. 154(b) by 2111 days.

(21) Appl. No.: 12/511,193

(22) Filed: Jul. 29, 2009

(65) Prior Publication Data

US 2011/0024287 A1 Feb. 3, 2011

(51) Int. Cl.
| | |
|---|---|
| *H01G 11/30* | (2013.01) |
| *C02F 1/461* | (2006.01) |
| *H01G 11/38* | (2013.01) |
| *H01G 11/26* | (2013.01) |
| *H01G 11/32* | (2013.01) |
| *H01G 11/48* | (2013.01) |
| *C02F 103/08* | (2006.01) |

(52) U.S. Cl.
CPC .......... *C02F 1/46109* (2013.01); *H01G 11/26* (2013.01); *H01G 11/32* (2013.01); *H01G 11/38* (2013.01); *H01G 11/48* (2013.01); *C02F 2001/46128* (2013.01); *C02F 2001/46138* (2013.01); *C02F 2001/46161* (2013.01); *C02F 2103/08* (2013.01); *C02F 2201/46115* (2013.01); *Y02E 60/13* (2013.01); *Y10T 156/10* (2015.01)

(58) Field of Classification Search
CPC ....... H01G 11/32; H01G 11/38; H01G 11/48
See application file for complete search history.

(56) References Cited

U.S. PATENT DOCUMENTS

| | | | |
|---|---|---|---|
| 4,188,464 A | | 2/1980 | Adams et al. |
| 4,602,426 A | * | 7/1986 | Kampe et al. ............... 29/623.1 |
| 4,892,797 A | | 1/1990 | Rao et al. |
| 5,705,259 A | * | 1/1998 | Mrotek et al. ................ 428/209 |
| 5,955,215 A | | 9/1999 | Kurzweil et al. |

(Continued)

FOREIGN PATENT DOCUMENTS

| | | |
|---|---|---|
| EP | 1329973 B1 | 7/2003 |
| JP | 2000182436 A | 6/2000 |

(Continued)

OTHER PUBLICATIONS

PCT/US2010/038129 Search Report and Written Opinion, Oct. 8, 2010.

(Continued)

*Primary Examiner* — Alison L Hindenlang
(74) *Attorney, Agent, or Firm* — Mary Loise Stanford

(57) ABSTRACT

A bipolar electrode comprises an intermediate layer comprising one or more carbon materials. The bipolar electrode further comprises first and second layers disposed on opposite surfaces of the intermediate layer and configured to act as an anode and a cathode. The first and second layers comprise at least one of one or more electrically conductive carbon materials and one or more conductive polymers. A supercapacitor desalination device and a method for making the bipolar electrode are also presented.

16 Claims, 3 Drawing Sheets

(56) References Cited

U.S. PATENT DOCUMENTS

| | | |
|---|---|---|
| 6,306,270 B1 | 10/2001 | Hanni et al. |
| 6,522,523 B2 | 2/2003 | Takatomi et al. |
| 6,550,117 B1 | 4/2003 | Tokuoka et al. |
| 7,282,291 B2* | 10/2007 | Narayanan et al. ........... 429/492 |
| 7,317,609 B2 | 1/2008 | Zhong et al. |
| 7,344,799 B2* | 3/2008 | Rusek ............................ 429/494 |
| 7,365,121 B2 | 4/2008 | Huang et al. |
| 7,476,459 B2* | 1/2009 | Wakahoi et al. .............. 429/437 |
| 2001/0033960 A1* | 10/2001 | Cavalca et al. ................. 429/40 |
| 2002/0136946 A1* | 9/2002 | Amatucci ........... H01M 2/0215 429/152 |
| 2002/0167784 A1 | 11/2002 | Takatomi et al. |
| 2004/0096718 A1* | 5/2004 | Gomez ............................ 429/30 |
| 2004/0229993 A1 | 11/2004 | Huang et al. |
| 2004/0241520 A1* | 12/2004 | Ha et al. ......................... 429/33 |
| 2005/0053822 A1* | 3/2005 | Miyake et al. ................. 429/33 |
| 2005/0208207 A1 | 9/2005 | Hinoki et al. |
| 2005/0231893 A1* | 10/2005 | Harvey .......................... 361/502 |
| 2006/0147780 A1* | 7/2006 | Jiang et al. ...................... 429/34 |
| 2007/0190398 A1* | 8/2007 | Sonai et al. ..................... 429/42 |
| 2008/0038612 A1* | 2/2008 | Fay et al. ......................... 429/30 |

FOREIGN PATENT DOCUMENTS

| | | |
|---|---|---|
| JP | 2001143976 A | 5/2001 |
| WO | 2008140556 A2 | 11/2008 |

OTHER PUBLICATIONS

Office Action issued in connection with corresponding JP Application No. 2012-522832 on Aug. 26, 2014.

* cited by examiner

BIPOLAR ELECTRODE AND SUPERCAPACITOR DESALINATION DEVICE, AND METHODS OF MANUFACTURE

BACKGROUND OF THE DISCLOSURE

The invention relates generally to electrodes and supercapacitor desalination devices using the electrodes, and methods for making the electrodes and supercapacitor desalination (SCD) devices. More particularly, the invention relates to bipolar electrodes and supercapacitor desalination devices using the bipolar electrodes, and methods for making the bipolar electrodes and the SCD devices.

SCD devices generally refer to supercapacitors that are employed for desalination of seawater or deionization of other brackish waters to reduce the amount of salt to a permissible level for domestic and industrial use. Generally, a supercapacitor cell has a double layer construction, in which a pair of electrodes typically comprising particulate activated carbon are separated by a microporous, electron-insulating, ion-conductive spacer element, comprising a uniformly-dispersed electrolyte component. The structure of the typical supercapacitor cell further comprises electrically conductive current collector elements in intimate contact with the respective electrodes.

For certain applications, some supercapacitor cells used for desalination are stacked together to form a SCD device. Since each of such supercapacitor cells includes a pair of electrodes and a pair of electrically conductive current collector elements in contact with the respective individual electrodes, it is complex to assemble such a SCD device, and the cost for manufacturing such a SCD device can be high.

Therefore, there is a need for a new and improved electrode and a supercapacitor desalination device using the electrode, and methods for making the same.

BRIEF DESCRIPTION OF THE DISCLOSURE

A bipolar electrode is provided in accordance with one embodiment of the invention. The bipolar electrode comprises an intermediate layer comprising one or more carbon materials. The bipolar electrode further includes a first layer and a second layer disposed on opposite surfaces of the intermediate layer and configured to act as an anode and a cathode. The first and second layers comprise at least one of one or more electrically conductive carbon materials and one or more conductive polymers.

A supercapacitor desalination device is provided in accordance with another embodiment of the invention. The supercapacitor desalination device comprises a first electrode, a second electrode, and one or more bipolar electrodes disposed between the first and second electrodes. The first and second electrodes, and the one or more bipolar electrodes are configured to adsorb ions in a charging state and desorb ions in a discharging state. Further, the supercapacitor desalination device comprises one or more electron-insulating and ion-conductive spacers disposed between each pair of adjacent electrodes, a first current collector configured to contact the first electrode, and a second current collector configured to contact the second electrode.

A method for manufacturing a bipolar electrode is provided in accordance with yet another embodiment of the invention. The method comprises providing and stirring a mixture comprising a solvent and at least one of one or more carbon materials and one or more conductive polymers to form a dispersion of the at least one of the one or more carbon materials and the one or more conductive polymers in the solvent, adding at least one binder into the dispersion to provide a resultant mixture and stirring the resultant mixture, processing the resultant mixture to form a plurality of electrode sheets, and attaching the electrode sheets on opposite surfaces of an intermediate layer These and other advantages and features will be more understood from the following detailed description of preferred embodiments of the invention that is provided in connection with the accompanying drawings.

DETAILED DESCRIPTION OF THE INVENTION

Preferred embodiments of the present disclosure will be described hereinbelow with reference to the accompanying drawings. In the following description, well-known functions or constructions are not described in detail to avoid obscuring the disclosure in unnecessary detail.

Figure 1:
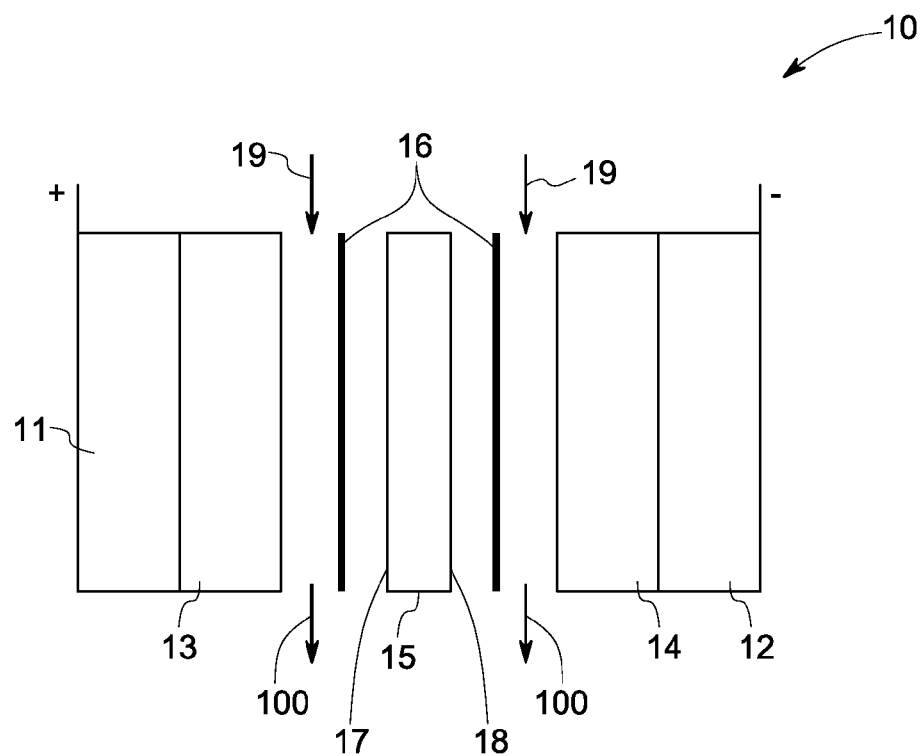
FIG. 1 is a schematic diagram of a supercapacitor desalination device in accordance with one embodiment of the invention.

FIG. 1 is a schematic diagram of a supercapacitor desalination (SCD) device 10 in accordance with one embodiment of the invention. In embodiments of the invention, the SCD device 10 is employed for desalination of seawater or de-ionization of other brackish waters to reduce the amount of salt to a permissible level for domestic and industrial use. Additionally, the SCD device 10 may remove or reduce other charged or ionic impurities from a liquid, such as wastewater or effluents from agricultural, industrial or municipal processes.

For the example arrangement depicted in FIG. 1, the SCD device 10 comprises a first current collector 11, a second current collector 12, a first electrode 13, a second electrode 14, a bipolar electrode 15, and a pair of spacers 16. The first and second electrodes 13 and 14 are in intimate contact with the first and second current collectors 11 and 12, respectively. The bipolar electrode 15 is disposed between the first and second electrodes 13 and 14. The two spacers 16 are disposed between the first electrode 13 and the bipolar electrode 15, and between the bipolar electrode 15 and the second electrode 14 respectively.

In some embodiments, the current collectors 11 and 12 may be configured as a plate, a mesh, a foil, or a sheet and formed from a metal or metal alloy. The metal may include titanium, platinum, iridium, or rhodium, for example. The metal alloys may include stainless steel, for example. In other embodiments, the current collectors 11 and 12 may comprise graphite or a plastic material, such as a polyolefin, which may include polyethylene. In certain applications, the plastic current collectors 11 and 12 may be mixed with conductive carbon blacks or metallic particles to achieve a certain level of conductivity.

For the example embodiment in FIG. 1, the first and second electrodes 13 and 14, and the bipolar electrode 15 are in the form of plates that are disposed parallel to each other to form a stacked structure. In certain embodiments, the electrodes 13, 14 and 15 may have varied shapes, such as a sheet, a block, or a cylinder. Further, these electrodes may be arranged in varying configurations. For example, the first and second electrodes, and the bipolar electrode may be disposed concentrically with a spiral and continuous space therebetween.

In some applications, the first and second electrodes 13 and 14 may include electrically conductive materials, which may or may not be thermally conductive, and may have particles with smaller sizes and large surface areas. In some examples, the electrically conductive material may include one or more carbon materials. Non-limiting examples of the carbon materials include activated carbon particles, porous carbon particles, carbon fibers, carbon aerogels, porous mesocarbon microbeads, or combinations thereof. In other examples, the electrically conductive materials may include a conductive composite, such as oxides of manganese, or iron, or both, or carbides of titanium, zirconium, vanadium, tungsten, or combinations thereof. In some embodiments, the electrically conductive materials of the electrodes 13 and 14 may be deposited on the current collectors 11 and 12 by employing one or more deposition techniques, such as sputtering, spraying, spin-coating, calendering or printing.

Additionally, the spacers 16 may comprise any ion-permeable, electronically nonconductive material, including membranes and porous and nonporous materials to separate the first electrode 13 and the bipolar electrode 15, and the second electrode 14 and the bipolar electrode 15. In non-limiting examples, the spacers 16 may have or themselves may be spaces to form flow channels through which a liquid for desalination passes between the first electrode 13 and the bipolar electrode 15, and the second electrode 14 and the bipolar electrode 15.

In certain applications, as depicted in FIG. 1, the first and second current collectors 11 and 12 may be connected to positive and negative terminals of a power source (not shown), respectively. Since the first and second electrodes 13 and 14 are in contact with the first and second current collectors 11 and 12, the first and second electrodes 13 and 14 may act as an anode and a cathode, respectively. Accordingly, one side 17 of the bipolar electrode 15 adjacent to the first electrode 13 may function as a cathode and the other side 18 of the bipolar electrode 15 opposite to the one side 17 and adjacent to the second electrode 14 may function as an anode. In certain examples, the bipolar electrode 15 may be electrically conductive and prevent ions from permeation.

Further, in some arrangements, a liquid source (not shown) may be employed to provide an input liquid (as indicated by arrows 19 in FIG. 1) for desalination through the SCD device 10. Accordingly, during a charging state, when an input liquid 19 from the liquid source, such as a sodium chloride solution, having charged species passes through between the first electrode 13 and the bipolar electrode 15, and the second electrode 14 and the bipolar electrode 15, cations move towards the side 17 of the bipolar electrode 15 and the cathode 14, anions move towards the anode 13 and the side 17 of the bipolar electrode 15. As a result of the charge accumulation inside the SCD device 10, an output stream (as indicated by arrows 100 in FIG. 1), which is a dilute liquid coming out of the SCD device 10, has a lower concentration of charged species as compared to the input liquid. In certain embodiments, the dilute liquid may be again subjected to de-ionization by being fed through another SCD device.

During a discharging state, the adsorbed ions dissociate from the surfaces of the first and second electrodes 13 and 14, and the bipolar electrode 15. In certain applications, in this state, the polarities of the first and second electrodes 13 and 14 can be reversed, so that the adsorbed ions adsorbed in the charging state move towards reverse polarities, as a result, the output stream may have a higher concentration of charged species compared to the input liquid.

In other applications, the anions and the cations in the charged species may be absorbed to the respective electrodes in a discharging state and dissociate from the respective electrodes in a charging state of the bipolar electrode 15.

It should be noted that the exemplary arrangement in FIG. 1 is merely illustrative. In some applications, the first and second electrodes 13 and 14 may act as a cathode and an anode, respectively. Accordingly, the side 17 of the bipolar electrode 15 adjacent to the first electrode 13 may function as an anode and the other side 18 of the bipolar electrode 15 opposite to the side 17 and adjacent to the second electrode 14 may function as a cathode.

Figure 2:
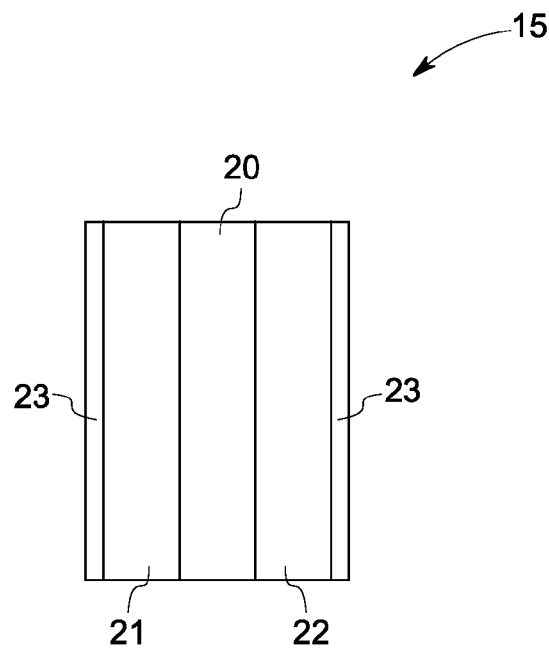
FIG. 2 is a schematic diagram of a bipolar electrode in accordance with one embodiment of the invention.

FIG. 2 is a schematic diagram of the bipolar electrode 15 in accordance with one embodiment of the invention. For the example arrangement, the bipolar electrode 15 comprises an intermediate layer 20, and first and second layers 21 and 22 disposed on opposite surfaces (not labeled) of the intermediate layer 20.

In some embodiments, the intermediate layer 20 may be electron conductive and ion non-conductive. In some examples, the intermediate layer 20 may comprise one or more carbon materials, such as carbon black and graphite. In other examples, the intermediate layer 20 may further comprise a polymer, such as polyethylene terephthalate (PET), polythene (PE), polypropylene (PP), poly(vinylidenechloride) (PVC), and combinations thereof to be interspersed with the one or more carbon materials.

In some applications, the intermediate layer 20 may be in the form of film. It should be noted that the term "film" may be similar to the meaning of "layer," "sheet," "plate," or "slice," and may not indicate a particular thickness of the material. In non-limiting examples, the intermediate layer 20 may comprise a graphite film. In certain example applications, the intermediate layer 20 may comprise a conductive film, sold under the tradename 3M 1704, by 3M, of Saint Paul, Minn. Alternatively, the intermediate layer 20 may comprise a film, sold under the tradename Intelicoat 2252, by Intelicoat, of South Hadley, Mass.

In some embodiments, the first and second layers 21 and 22 may act as an electronegative layer and an electropositive layer so as to function as an anode and a cathode, respectively. Alternatively, the first and second layers 21 and 22 may act as an electropositive layer and an electronegative so as to function as a cathode and an anode, respectively. The first and second layers 21 and 22 may comprise the same or different materials. In non-limiting examples, the first and second layers may comprises electrically conductive materials including at least one of one or more carbon materials and one or more conductive polymers. The one or more carbon materials may comprise activated carbon particles, porous carbon particles, carbon fibers, carbon aerogels, porous mesocarbon microbeads, or combinations thereof. The one or more conductive polymers may comprise polyaniline, polypyrrole, and combinations thereof. In certain examples, the first and second layers 21 and 22 may further comprise other materials, such as additives including, but not limited to polytetrafluoroethylene (PTFE).

In certain examples, the bipolar electrode 15 may further comprise a pair of adhesive layers (not shown) disposed between the first layer 21 and the intermediate layer 20, and the second layer 22 and the intermediate layer 20 so as to attach the first and second layers on the intermediate layer 20 stably. Alternatively, the adhesive layers may not be provided. In some embodiments, the adhesive layers may comprise at least one of graphite-based polymer films, carbon black based polymer films, conductive graphite adhesives, and carbon black adhesives. The adhesive layers may be disposed on two opposite surfaces (not labeled) of the intermediate layer 20 by employing one or more deposition techniques, such as sputtering, spraying, or spin-coating.

For some arrangements, a pair of reinforcement layers 23 may be provided to reinforce mechanical property of the bipolar electrode 15. The reinforcement layers 23 may be disposed on and/or within the first and second layers 21 and 22. In non-limiting examples, the reinforcement layers 23 may comprise one or more polymers including polyethylene terephthalate (PET), polythene (PE), polypropylene (PP), poly(vinylidenechloride) (PVC), and combinations thereof. The PET layers may have netted textures or other shapes. In certain applications, the PET layers may also be employed in the first and second electrodes 13 and 14.

In certain applications, the SCD device 10 may further comprise one or more ion selective materials (not shown), such as cation and anion selective materials attached to and/or extended into the respective electrodes 13, 14, and 15 to facilitate transmission of the ions. In non-limiting examples, the cation selective materials may comprise an amine group, a pyridinium group, or combinations thereof. In some examples, the amine group may comprise a primary amine, secondary amine, tertiary amine, and/or quaternary amine. The anion selective materials may comprise a sulfonic group, carboxylic group, phosphate group, or combinations thereof.

Figure 3:
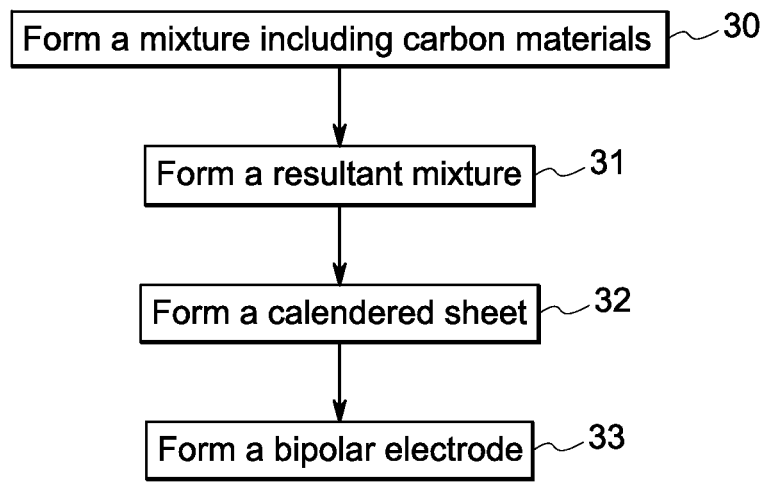
FIG. 3 is a flow chart schematically illustrating preparation of the bipolar electrode in accordance one embodiment of the invention.

FIG. 3 is a flow chart schematically illustrating preparation of the bipolar electrode 15 in accordance with one embodiment of the invention. As illustrated in FIG. 2, in step 30, a mixture of a first solvent and at least one of the one or more carbon materials and the one or more conductive polymers is provided and stirred so as to form a dispersion of the carbon particles in the first solvent. In some applications, the solvent may comprise deionized water, ethanol, or any other suitable solvents. In step 31, at least one binder including, but not limited to a non-fibrillated PTFE emulsion is added into the above mixture and mixed to provide a resultant mixture until at least a portion of the PTFE has been fibrillated. The resultant mixture is then mixed and dried.

In step 32, the resultant mixture is added into a second solvent so as to form a mixed paste. The mixed paste is then processed, such as drying and calendering to form a calendered sheet. In some examples, the process for drying the mixed resultant mixture in the step 31 may not be employed, so that the mixed paste in the step 32 may be directly formed from the resultant mixture. In step 33, the calendered sheet is shaped into a plurality of electrode sheets with desired sizes and shapes, and the electrode sheets are pressed on two opposite surfaces of an electron conductive film to form the bipolar electrode 15.

In some examples, in step 31, vapor grown carbon fibers (VGCF) and/or conductive carbon blacks may be added into the mixture of the carbon materials and the first solvent so as to improve the conductivity of the formed bipolar electrode 15. Alternatively, the VGCF and the carbon blacks may not be employed. In one non-limiting example, the conductive carbon blacks may comprise carbon blacks, sold under trademark SUPER P, by Timcal Graphite & Carbon, of Switzerland.

In step 32, one or more pore-forming agents, such as sodium chloride powders may be mixed with the dried resultant mixture, and then the second solvent is added into mixture of the sodium chloride pore-forming agent and the dried resultant mixture to form the mixed paste so as to improve the porosity of the formed bipolar electrode 15. In certain examples, the sodium chloride pore-forming agent may not be added into the resultant mixture, and the first solvent may be different from or the same as the second solvent. In non-limiting examples, in step 33, the adhesive layers and/or the ion selective elements may be provided with the electrode sheets to form the bipolar electrode 15.

In some examples, the pore-forming agent may comprise other materials, such as ammonium chloride, potassium chloride, calcium chloride, sodium carbonate, potassium carbonate, calcium carbonate, ammonium carbonate, ammonium acid carbonate, titanium oxide, zinc oxide, or combinations thereof.

Additionally, in certain applications, the electrode sheets may also be disposed on the current collectors 11 and 12 respectively to form the first and second electrodes 13 and 14.

One non-limiting example for preparation of the bipolar electrode 15 is now described.

EXAMPLE 1

800 g of activated carbon particles, 16 g of VGCF, 40 g of SUPER P conductive carbon blacks, and 3500 ml of deionized water are mixed and stirred for about 15 minutes, so as to form a dispersion of the active carbon particles in the deionized water. 53 g of a 60% (w/w) PTFE latex are added into 60 ml of deionized water for dilution to form a non-fibrillated PTFE emulsion, and then the non-fibrillated PTFE emulsion is added into the above mixture and stirred together for about 4 hours so as to form a resultant mixture until at least a portion of the PTFE has been fibrillated.

Then, the resultant mixture is dried at a temperature of about 100-130° C. for about more than 48 hours. Next, for easy preparation, about 200 g of the resultant mixture is weighed and mixed with 60 g of the sodium chloride powders and one liter of ethanol for about 5 minutes to form a liquid mixture. The liquid mixture is dried at a temperature of about 60° C. so as to form a mixed paste weighing about 650 g.

Next, the mixed paste is calendered to form a calendered sheet. For calendering, a calender (not shown) with two rollers is employed. A distance between the two rollers is set to about 4 mm, the mixed paste is put through the rollers to form a thin sheet, and then the thin sheet is folded and reinserted into the calender for about 3 to 5 times. After that, in some applications, the distance between the two rollers may be set at about 3.5 mm, 3.0 mm, 2.5 mm, 2.0 mm, 1.5 mm, 1.0 mm, and 0.75 mm in turn to calender the thin sheet, so that the calendered sheet is formed.

Subsequently, the calendered sheet is shaped into a plurality of electrode sheets with desired sizes and shapes, and the electrode sheets are dried at a temperature of about 40° C. for about half hour. In some applications, the electrode sheets may not be dried. After that, the electrode sheets are immersed into deionized water for about 3 hours to resolve and remove the sodium chloride from the electrode sheets. Then, the electrode sheets are put into a ventilated oven (not shown) at a temperature of about 45° C. for about 3 hours to remove water.

Finally, the intermediate conductive film, the electrode sheets, and the PET layers are pressed together at a pressure of about 15 Mpa for about 40 seconds to form the bipolar electrode 15, as depicted in FIG. 2. In non-limiting examples, the electrode sheet may weigh about 25-30 g, and have a thickness of about 0.8 mm. The bipolar electrode 15 may weigh about 55-60 g, and have a thickness of about 1.6 mm.

In certain examples, the adhesive layers and/or ion selective materials are also pressed within the bipolar electrode 15. Additionally, for some arrangements, the electrode sheets may be pressed on Ti-meshes at a pressure of about 15 Mpa for about 40 seconds to form the first and second electrodes 13 and 14. Alternatively, the first and second electrodes 13 and 14 may be formed with other materials in addition to the prepared electrode sheets.

It should be noted that the depicted example is merely illustrative. The order of the steps in the depicted example may be changeable, for example, the removal of the sodium chloride may be prior to shaping the calendered sheet the plurality of electrode sheets. Additionally, some steps including, but not limited to the steps for adding and removing the sodium chloride, may not be strictly necessary.

Accordingly, as depicted in FIG. 1, an example assembling process for the SCD device 10 comprises providing the first and second electrodes 11 and 12, providing first and second current collectors 13 and 14 to contact the respective electrodes 11 and 12, disposing the bipolar electrode 15 between the first and second electrodes 11 and 12, and disposing the spacers 16 between the two adjacent electrodes. In non-limiting examples, the order of the steps of the example process may be changeable, and the process may further comprise other steps, for example pressing PET layers on the first and second electrodes 11 and 12.

Figure 4:
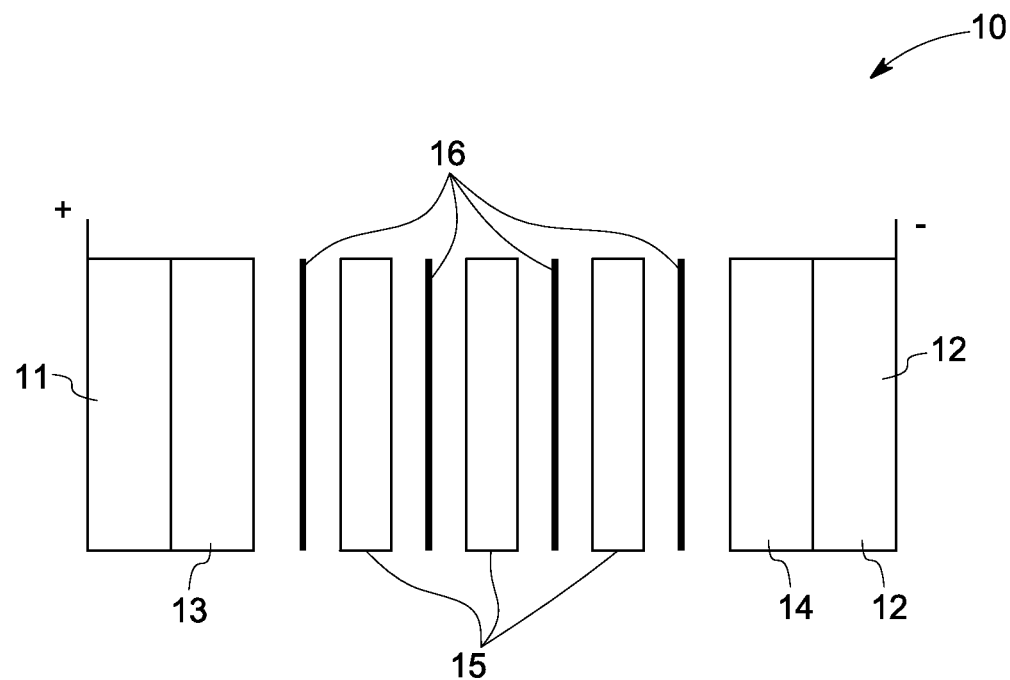
FIG. 4 is a schematic diagram of the supercapacitor desalination device in accordance with another embodiment of the invention.

For some arrangements, the SCD device 10 may comprise more than one bipolar electrode 15 an may be in the form of a stack for desalination of relatively large quantity of a liquid. FIG. 4 is a schematic diagram of a stack SCD device 10. The same numerals in FIGS. 1 and 4 may indicate similar elements. For the illustrated arrangement, the SCD device comprises a first current collector 11, a second current collector 12, a first electrode 13 attached on the current collector 11, a second electrode 14 attached on the current collector 12, multiple bipolar electrodes 15 disposed between the first and second electrodes 13 and 14, and a plurality of spacers 16 disposed between each of the pairs of adjacent electrodes.

Figure 5:
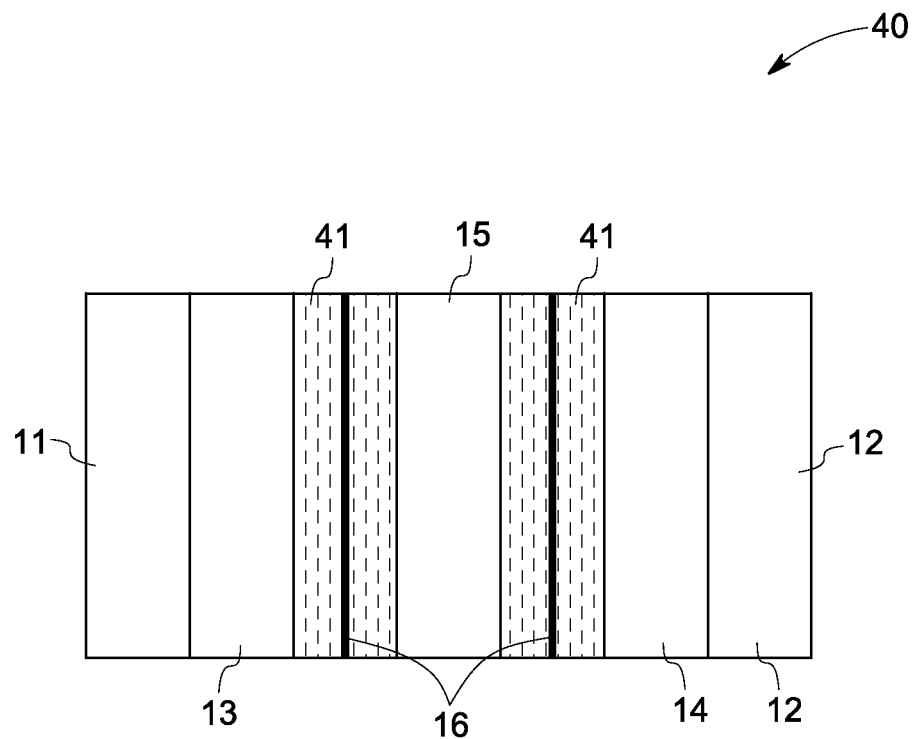
FIG. 5 is a schematic diagram of a supercapacitor in accordance with one embodiment of the invention.

In certain example applications, the SCD device 10 may be used as a supercapacitor for energy storage. FIG. 5 is a schematic diagram of a supercapacitor 40 in accordance with one embodiment of the invention. The same numerals in FIGS. 1, 4 and 5 may indicate the similar elements. As depicted in FIG. 5, the illustrated arrangement is similar to the arrangement in FIG. 1. The two arrangements in FIGS. 1 and 5 differ in that an electrolyte 41, such as sodium chloride is enclosed within the structure so as to form the supercapacitor 30 for energy storage.

For the illustrated embodiment in FIG. 5, the first and second current collectors 11 and 12 may be connected to a power source (not shown) for charging the supercapacitor 30. During discharge, the released energy generated due to dissociation of the adsorbed ions from the surfaces of the respective electrodes 13, 14, and 15 of the supercapacitor 30 may be used to drive an electrical device (not shown), such as a light bulb, or recovered through an energy recovery device (not shown), such as a bi-directional DC-DC converter. Additionally, in other examples, the supercapacitor 30 may comprise a plurality of bipolar electrodes 15 and a plurality of spacers 16, as similar to the structure depicted in FIG. 4.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A method for manufacturing a functional electrode, the method comprising:
providing and stirring a mixture comprising a solvent and at least one of one or more carbon materials and one or more conductive polymers to form a dispersion of the at least one of the one or more carbon materials and the one or more conductive polymers in the solvent;
adding at least one binder into the dispersion to provide a resultant mixture and stirring the resultant mixture;
processing the resultant mixture to form a plurality of electrode sheets; and
attaching the electrode sheets on opposite surfaces of an intermediate layer,
wherein the intermediate layer is electron conductive and ion non-conductive.

2. The method of claim 1, wherein the functional electrode comprises a bipolar electrode.

3. The method of claim 1, wherein the mixture further comprises one or more of carbon fibers, conductive carbon black, and carbon nanotubes.

4. The method of claim 1, wherein the solvent comprises water, ethanol, and combinations thereof.

5. The method of claim 1, wherein processing the resultant mixture comprises mixing one or more pore-forming agents with different particles sizes and the resultant mixture with another solvent to form a mixed paste and processing the mixed paste to form the electrode sheets.

6. The method of claim 5, wherein the one or more pore-forming agent are selected from the group consisting of sodium chloride, ammonium chloride, potassium chloride, calcium chloride, sodium carbonate, potassium carbonate, calcium carbonate, ammonium carbonate, ammonium acid carbonate, titanium oxide, zinc oxide, and combinations thereof.

7. The method of claim 5, wherein processing the mixed paste comprises calendering the mixed paste to form a calendered sheet, immersing the calendered sheet into deionized water to remove the one or more pore-forming agents, drying the calendered sheet after removal of the one or more pore-forming agents, and shaping the calendered sheet into the electrode sheets after drying.

8. The method of claim 1, further comprising attaching one or more reinforcement layers disposed on at least one of the electrode sheets, wherein the one or more reinforcement layers are selected from the group consisting of polyethylene terephthalate (PET), polyethene (PE), polypropylene (PP), poly(vinylidenechloride) (PVC), and combinations thereof.

9. The method of claim 1, further comprising disposing one or more anion selective materials and one or more cation selective materials on the respective electrode sheets.

10. The method of claim 9, wherein the one or more cation selective materials are selected from the group consisting of an amine group, a pyridinium group and combinations thereof, wherein the amine group comprises one or more of a primary amine, secondary amine, tertiary amine, and quaternary amine, and wherein the one or more anion selective materials are selected from the group consisting of a sulfonic group, carboxylic group, phosphate group, and combinations thereof.

11. The method of claim 1, wherein the one or more carbon materials are selected from the group consisting of activated carbon particles, carbon aerogels, carbon nanotubes, carbon cages, carbon fibers, porous carbon particles, porous mesocarbon microbeads, and combinations thereof, and wherein the one or more conductive polymers are selected from the group consisting of polyaniline, polypyrrole, and combinations thereof.

12. The method of claim 1, wherein the intermediate layer comprises one or more of carbon black, graphite, and a polymer, and wherein the polymer is selected from the group consisting of polyethylene terephthalate, polyethene, polypropylene, poly(vinylidenechloride), and combinations thereof.

13. The method of claim 1, wherein the binder comprises non-fibrillated polytetrafluoroethylene.

14. The method of claim 1, further comprising introducing one or more of vapor grown carbon fibers and conductive carbon blacks into the mixture comprising the solvent and the at least one of the one or more carbon materials and the one or more conductive polymers.

15. The method of claim 2, wherein the electrode sheets comprise a first and a second electrode sheet, wherein the first and second electrode sheets act as a first and a second layer of the bipolar electrode, and wherein the first and second layers of the bipolar electrode are configured to function as an anode and a cathode, respectively.

16. The method of claim 15, further comprising disposing a plurality of adhesive layers between the first layer and the intermediate layer, and between the second layer and the intermediate layer respectively, and wherein the adhesive layers comprise at least one of carbon-based polymer films and carbon conductive adhesives.

* * * * *